(12) United States Patent
Ito

(10) Patent No.: US 8,226,258 B2
(45) Date of Patent: Jul. 24, 2012

(54) SURFACE LIGHT SOURCE DEVICE, MANUFACTURING METHOD OF THE SAME, AND IMAGE DISPLAY DEVICE

(75) Inventor: Atsushi Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 12/604,101

(22) Filed: Oct. 22, 2009

(65) Prior Publication Data
US 2010/0103652 A1    Apr. 29, 2010

(30) Foreign Application Priority Data

Oct. 27, 2008 (JP) ............... P2008-275096
Mar. 30, 2009 (JP) ............... P2009-081099

(51) Int. Cl.
*G02F 1/13357* (2006.01)
*F21V 7/00* (2006.01)
*G09F 13/08* (2006.01)

(52) U.S. Cl. ........... 362/97.1; 362/97.2; 362/217.05; 362/632; 362/633; 362/634

(58) Field of Classification Search ........... 362/97.1, 362/97.2, 29, 30, 561, 632–634, 217.05
See application file for complete search history.

(56) References Cited

U.S. PATENT DOCUMENTS

| | | | | |
|---|---|---|---|---|
| 7,059,736 B2* | 6/2006 | Yu et al. | ........ | 362/97.1 |
| 7,070,313 B2* | 7/2006 | Kim et al. | ........ | 362/561 |
| 8,075,151 B2* | 12/2011 | Ito et al. | ........ | 362/97.1 |
| 2007/0035942 A1* | 2/2007 | Chang | ........ | 362/97 |
| 2007/0242446 A1* | 10/2007 | Lee | ........ | 362/29 |
| 2009/0185364 A1* | 7/2009 | Ito et al. | ........ | 362/97.1 |
| 2010/0079981 A1* | 4/2010 | Chen et al. | ........ | 362/97.2 |
| 2010/0124043 A1* | 5/2010 | Lee et al. | ........ | 362/97.1 |

FOREIGN PATENT DOCUMENTS

| | | |
|---|---|---|
| JP | 61-143821 | 9/1986 |
| JP | 63-89609 | 6/1988 |
| JP | 10-283818 | 10/1998 |
| JP | 2004-055182 | 2/2004 |
| JP | 2004-63102 | 2/2004 |
| JP | 2005-276518 | 10/2005 |
| JP | 2005-285535 | 10/2005 |
| JP | 2007-286360 | 11/2007 |
| JP | 2008-140709 | 6/2008 |
| JP | 2008-147170 | 6/2008 |
| JP | 2008-203693 | 9/2008 |

* cited by examiner

*Primary Examiner* — Stephen F Husar
*Assistant Examiner* — James Cranson, Jr.
(74) *Attorney, Agent, or Firm* — Finnegan, Henderson, Farabow, Garrett & Dunner, L.L.P.

(57) ABSTRACT

A surface light source device includes: a light source; a diffusion member that diffuses light; and reflection means provided on a side opposite to the diffusion member with the light source interposed therebetween for reflecting light emitted from the light source toward the diffusion member, wherein the reflection means is formed by layering a plurality of optical components and the plurality of optical components are stopped by each other with stopper means.

14 Claims, 5 Drawing Sheets

SURFACE LIGHT SOURCE DEVICE, MANUFACTURING METHOD OF THE SAME, AND IMAGE DISPLAY DEVICE

BACKGROUND OF THE INVENTION

1. Field of the Invention

The present invention relates to a surface light source device, a manufacturing method of the same, and an image display device.

2. Description of Related Art

There is a surface light source device that illuminates using a light source, such as a cold cathode fluorescent lamp (CCFL) and a light emitting diode (LED). The surface light source is used, for example, as an illumination device by using the light source as direct illumination and in an image display device, such as a TV set and a personal computer, by using the light source as backlight illumination.

One type of image display device equipped with the surface light source device is a liquid crystal display using a liquid crystal panel as a display panel. The liquid crystal display is a non-self-luminous display. Accordingly, it is necessary to include a surface light source device that irradiates light to the liquid crystal panel from behind. In this case, the surface light source device is used as a backlight that irradiates light to the liquid crystal panel from behind.

The surface light source device chiefly includes a linear lamp, a reflection sheet that reflects light emitted from the lamp toward the liquid crystal panel, a diffusion member that obtains homogeneous planar light by diffusing light from the lamp and the reflection sheet, and a housing that encloses the foregoing members. For those who supply the surface light source devices into the market, it is one of the goals to achieve a size reduction of the surface light source device by reducing the number of lamps serving as light sources.

There is a method of shortening a distance between the light source and the diffusion member as a measure to achieve a size reduction of the surface light source device. However, when the distance between the light source and the diffusion member is shortened, the presence of the lamp serving as the light source is more readily acknowledged as a lamp image. The lamp image referred to herein means a phenomenon in which luminance becomes higher in a portion where the lamp is present than in the other portions when the surface light source device is viewed over the diffusion member, so that the shape of the lamp is visually confirmed. Such being the case, as a technique of reducing luminance irregularities, for example, JP-A-10-283818 proposes a technique of disposing a lens sheet between the light source and the reflection sheet. It should be noted, however, that the cited reference fails to teach a method of fixing the lens sheet.

On the other hand, a large surface light source device uses a fixing member referred to as a lamp supporter or a lamp clip in order to maintain a relative positional relation among the respective members. The fixing member is normally provided with a support portion that maintains a distance between the diffusion member and the reflection sheet, at least one lamp fixing portion used to fix the lamp, and an attachment portion used to attach the fixing portion itself to the housing. A method proposed in the related art is to fix the lens sheet and the reflection sheet at the same time using the fixing member.

SUMMARY OF THE INVENTION

Generally, a large liquid crystal display is often used with the screen of the liquid crystal panel standing vertically. In this case, the lens sheet separates by gravity and may possibly fall toward the light source. When the lens sheet separates, the lens sheet deviates from the design value. The display quality is therefore deteriorated. Also, in order to prevent deterioration of the display quality, it is necessary to dispose a large number of the fixing members. However, this prevention method is not preferable because the number of components is increased as a result.

It is therefore desirable to provide a scheme capable of preventing separation of an optical component without increasing the number of components, such as the fixing members, in a case where a plurality of optical components forming a reflection portion are provided in a layered state at a position opposing the diffusion member with the light source interposed therebetween.

According to an embodiment of the present invention, there is provided a surface light source device including a light source, a diffusion member that diffuses light, and reflection means provided on a side opposite to the diffusion member with the light source interposed therebetween for reflecting light emitted from the light source toward the diffusion member. The reflection means is formed by layering a plurality of optical components and the plurality of optical components are stopped by each other with stopper means.

In the surface light source device according to the embodiment of the present invention, by stopping a plurality of optical components forming the reflection means by each other with the stopper means, for example, when a first optical component is stopped by a second optical component with the stopper means, it becomes possible to prevent the first optical component from separating from the second optical component.

According to another embodiment of the present invention, there is provided a surface light source device including a light source, a diffusion member that diffuses light, reflection means provided on a side opposite to the diffusion member with the light source interposed therebetween for reflecting light emitted from the light source toward the diffusion member, a housing that encloses the light source and the reflection means, and a power feeding cover member that is attached to the housing so as to cover a feeding portion from which power is fed to the light source. The reflection means is formed by layering a plurality of optical components and a part of at least one optical component among the plurality of optical components is inserted into a space between the housing and the power feeding cover member.

In the surface light source device according to the embodiment of the present invention, by inserting a part of at least one optical component among a plurality of optical components forming the reflection means into a space between the housing and the power feeding cover member, it becomes possible to prevent separation of the optical component.

According to the embodiments of the present invention, in a case where a plurality of optical components forming the reflection means are provided at a position opposing the diffusion member with the light source interposed therebetween, it becomes possible to prevent separation of the optical component without increasing the number of components, such as the fixing member.

DESCRIPTION OF THE PREFERRED EMBODIMENTS

Hereinafter, embodiments of the present invention will be described concretely in detail with reference to the drawings. It should be appreciated, however, that the technical scope of the present invention is not limited to the embodiments described below and the invention includes various modifications and improvements within the scope to achieve particular advantages obtained by the components of invention and a combination thereof.

Embodiments of the present invention as the best mode will be described in the following order:

1. First embodiment;
2. Second embodiment;
3. Third embodiment; and
4. Fourth embodiment.

1. First Embodiment

Figure 1:
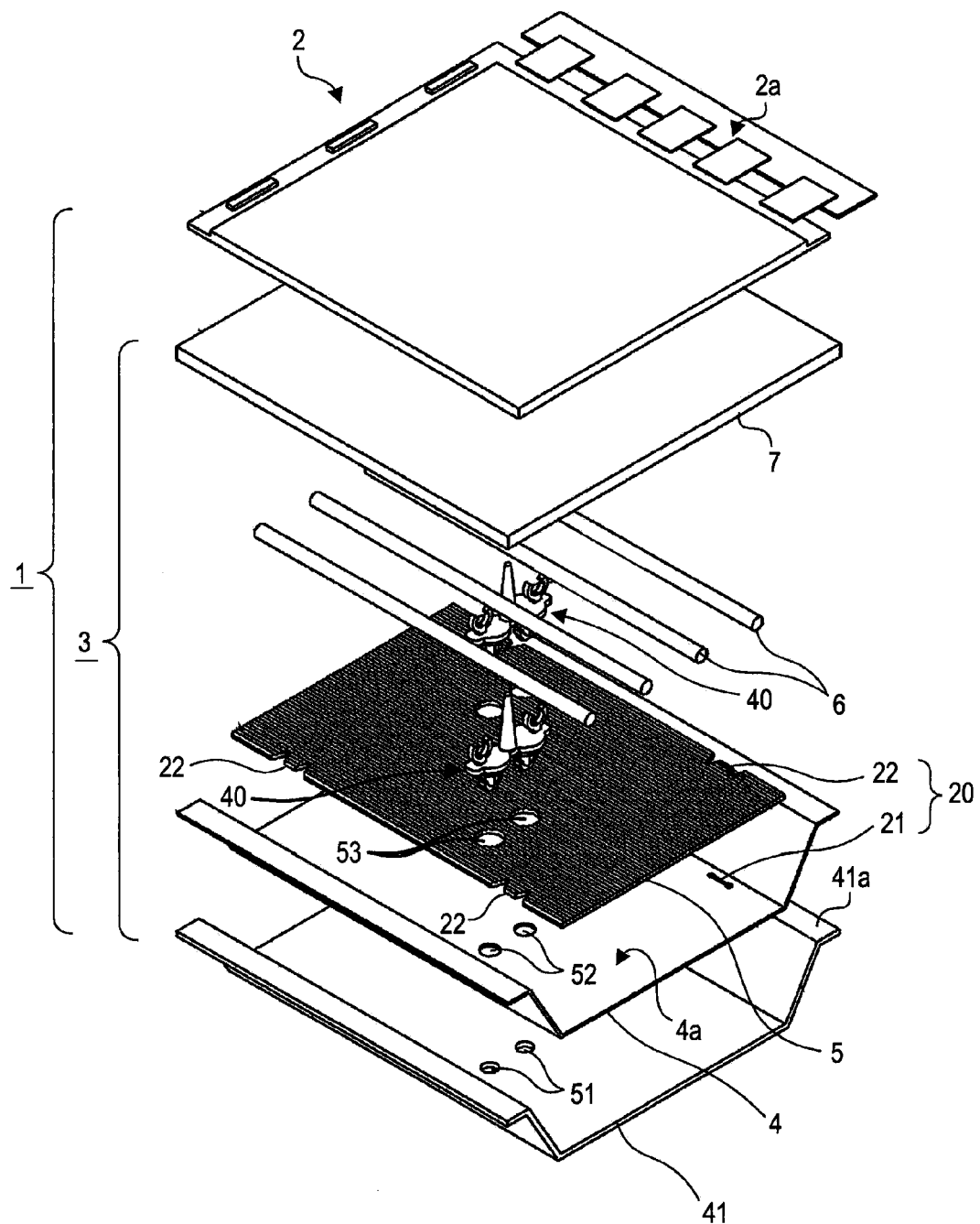
FIG. 1 is an exploded perspective view showing the configuration of an image display device according to an embodiment of the present invention.

FIG. 1 is an exploded perspective view showing the configuration of an image display device according to an embodiment of the present invention described as a first embodiment. Largely speaking, an image display device 1 includes a display panel 2 on which an image is displayed and a surface light source device 3 that irradiates light to the display panel 2. In a case where the image display device 1 is a liquid crystal display, the display panel 2 is a liquid crystal panel and the surface light source device 3 is a backlight.

The image display device 1 is formed of necessary components disposed at the corresponding positions within an unillustrated outer housing. In this case, the outer housing is formed in a box shape that is flat from front to rear and opens toward the front. The display panel 2 is disposed at a position to close the opening from inside. The display panel 2 is of a configuration in which, for example, a transmissive color liquid crystal panel is sandwiched by two polarization plates from the front and rear (the light incident side and the light exiting side). In this case, the display panel 2 displays a full-color video when driven by an active matrix method.

The display panel 2 displays an image thereon by selectively transmitting light irradiated from the surface light source device 3 pixel by pixel that are arrayed in a matrix fashion. A drive circuit portion 2a is connected to the end portion of the display panel 2. The drive circuit portion 2a is a circuit portion that controls driving of the display panel 2.

The surface light source device 3 is disposed inside the outer housing. The surface light source device 3 includes a reflection member 4, a light control member 5, a plurality of light sources 6, and a diffusion member 7. When the surface light source device 3 is viewed from the side of the display panel 2, the reflection member 4, the light control member 5, the light sources 6, and the diffusion member 7 are disposed sequentially from back to front. The surface light source device 3 is disposed in a state where the diffusion member 7 opposes the display panel 2. Each of the reflection member 4, the light control member 5, and the diffusion member 7 is formed in a sheet-like shape. The term, "sheet-like shape", referred to herein includes a plate-like shape and a film-like shape independently of the rigidity of members.

The reflection member 4 uses the surface opposing the light sources 6 and the diffusion member 7 as a reflection surface 4a and is formed in the shape of a wing when viewed from the side surface. The reflection member 4 has rigidity high enough to maintain the wing-like shape when viewed from the side surface. The reflection surface 4a of the reflection member 4 is disposed to be parallel to the diffusion member 7. The reflection member 4 is classified into a type chiefly using mirror refection and a type chiefly using diffuse reflection. Herein, it is preferable to use the type chiefly using diffuse reflection for the following reason. That is, in the case of the type chiefly using mirror reflection, directivity of reflection light is so strong that it is acknowledged as irregularities on a display whereas the directivity of reflection light is weak and it is hardly acknowledged as irregularities on a display in the case of the type chiefly using diffuse reflection. The reflection member 4 chiefly using diffuse reflection is obtained, for example, by encapsulating many air bubbles within a PET (polyethylene terephthalate) film. It should be appreciated, however, that the configuration is not limited to this example. In addition, a material forming the reflection member 4 can be either resin or metal.

The light control member 5 is an optical component that forms a reflection portion together with the reflection member 4. The reflection portion is provided on the side opposite to the diffusion member 7 with the light sources 6 interposed therebetween and reflects light emitted from the light sources 6 toward the diffusion member 7. The light control member 5 is formed, for example, in a rectangular shape when viewed in a plane as is shown in the drawing. The light control member 5 is layered on the reflection surface 4a of the reflection member 4. The light control member 5 is formed by layering sheets of a light transmissive material, for example, a transparent material, such as acrylic, polycarbonate, polystyrene, and glass, either solely or in combination.

A plurality of the light sources 6 are aligned in a planar fashion between the diffusion member 7 and the reflection member 4. Each light source 6 is disposed in a state so as to oppose the reflection surface 4a of the reflection member 4 with the light control member 5 interposed therebetween. As the light sources 6, for example, a rod-shaped cold cathode fluorescent lamp (CCFL) is used. It should be appreciated, however, that the light sources 6 are not limited to the cold cathode fluorescent lamps and other light sources, such as a hot cathode fluorescent lamp, a xenon lamp, and a light emitting diode (LED), can be used as well.

Each light source 6 is formed in an elongate circular cylindrical shape. The light sources 6 are disposed in such a manner that the longitudinal direction (extending direction) of the light sources 6 is along the right-left direction of the screen of the display panel 2. The light sources 6 are supported on fixing members 40 at somewhere in the middle in the longitudinal direction. The configuration of the fixing members 40 will be described below. The light sources 6 are disposed at substantially regular intervals in the top-bottom direction of the screen of the display panel 2. The both end portions of each light source 6 in the longitudinal direction are held in sockets (not shown) serving as power feeding portions. It is therefore configured in such a manner that the light sources 6 emit light when power is fed from the sockets. For a compact surface light source device, a lamp bent in the shape of a letter U is used as the light source in some cases. However, the present invention is applicable independently of the shape of the light source.

The diffusion member 7 diffuses light incident on the diffusion member 7 in order to make light that goes incident on the display panel 2 homogeneous. Also, the diffusion member 7 is disposed between the light sources 6 and the display panel 2 in a state where it opposes the reflection surface 4a of the reflection member 4. The diffusion member 7 is furnished with a capability of supplying homogeneous light toward the display panel 2 by diffusing light incident on the diffusion member 7. As the diffusion member 7, for example, a mixture with a directionless light scattering substance can be used.

The light control member 5 will now be described more in detail. The light control member 5 is furnished with a light guiding capability of guiding light incident on the light control member 5 among rays of light emitted from the respective light sources 6 in a predetermined direction. The term, "a predetermined direction", referred to herein means a direction in which a plurality of the light sources 6 are aligned side by side in a planar fashion as described above. The light guiding capability of the light control member 5 is exerted by a prism function of a concavo-convex structure portion (not shown) formed on either one surface or the both surfaces of the light control member 5. In the concavo-convex structure portion of the light control member 5, the cross section when viewed in a direction orthogonal to the alignment direction of the light source 6 is formed in a geometric configuration. As an example of the sectional geometric configuration, the concavo-convex structure portion is formed in a continuous concavo-convex shape having a triangular cross section. Each convex portion in the concavo-convex structure portion having a triangular cross section substantially functions as a prism and the light guiding capability of the light control member 5 is achieved by this prism function. By guiding part of light irradiated from the light sources 6 to the light control member 5 in the alignment direction of the light sources 6 using the light guiding capability, the light control member 5 forces incident light from the light sources 6 to head toward the diffusion member 7 at a position shifted from the light incident position in the alignment direction of the light source 6. Consequently, light reflected on the reflection portion (members 4 and 5) and headed toward the diffusion member 7 is made homogeneous by the light guiding capability of the light control member 5. It thus becomes possible to obtain a reduction effect on the lamp image. The configuration and the function of the light control member 5 are described in commonly owned earlier Japanese Patent Application JP 2008-190601.

By forming the light control member 5 using, for example, a material absorbing UV rays, an UV resistance capability is furnished to the light control member 5. Components of light emitted from the light sources 6 contain UV rays. Accordingly, by furnishing the UV resistance capability to the light control member 5, it becomes possible to prevent deterioration of the light control member 5.

The diffusion member 7 has to have sufficient diffusivity in order to eliminate the directivity of light coming from the light control member 5 and also to let the lamp image vanish. In addition, in order to enhance the use efficiency of light emitted from each light source 6, it is necessary for the diffusion member 7 to have low light absorptance. In order to ensure the characteristics as above, the diffusion member 7 is formed by mixing a material used as the base material with transparent fine particles having a different refractive index. As the base material, for example, polystyrene is used. As the transparent fine particles, for example, silicon or acrylic is used.

It is also possible to obtain a desired optical characteristic by providing an arbitrary optical component on the light-exiting surface of the diffusion member 7 so as to achieve the desired optical characteristic. For example, it is possible to use an optical component formed by scattering and fixedly attaching beads onto a base material, such as transparent PET, with an expectation to achieve the lens effect from the curved surfaces of the beads, a sheet on which fine prisms are arrayed in order to enhance the luminance in the front direction, or a polarization reflection sheet.

There is a case where a desired display quality is not obtained by merely disposing the light control member 5 between the light sources 6 and the reflection member 4 and a portion on the light sources 6 looks brighter than the other portions. In such a case, it may be configured in such a manner that the prism function portion same as that in the light control member 5 is provided to the surface of the diffusion member 7, a prism sheet is inserted between the light sources 6 and the diffusion member 7, or a prism sheet is inserted between the diffusion member 7 and the display panel 2.

Figure 2:
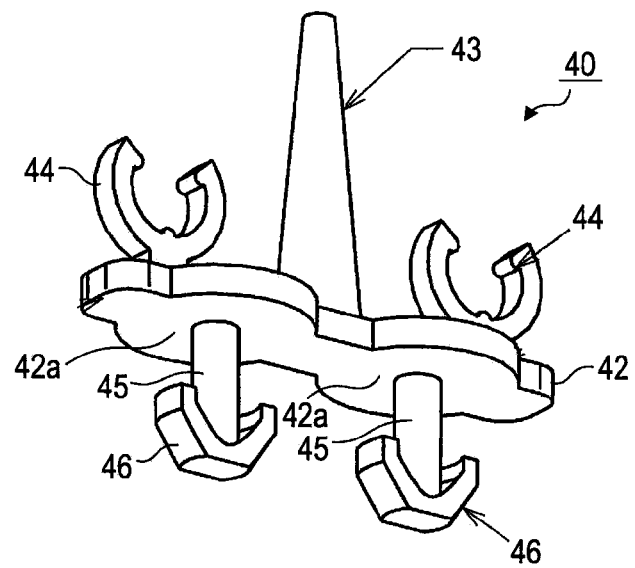
FIG. 2 is a perspective view showing the structure of a fixing member.

The fixing members 40 are provided to fix the reflection member 4 and the light control member 5 to a housing 41. The fixing members 40 are obtained, for example, by molding a white resin material. A material obtained, for example, by mixing polycarbonate with a white pigment can be used. It should be appreciated, however, that a resin material other than this example can be used as well. For example, as is shown in FIG. 2, each fixing member 40 has a structure in which a base portion 42, a support portion 43, two light source fixing portions 44, two pin portions 45, and two expansion and contraction portions 46 are formed integrally. The base portion 42 is formed in the shape of a flat plate that looks like glasses having two lid portions 42a each swelling substantially in a circular shape when viewed in a plane. The support portion 43 is provided to the base portion 42 at the center in the longitudinal direction in an upright standing state from one surface of the base portion 42. The major diameter of the support portion 43 becomes smaller gradually toward the tip end.

The two light source fixing portions 44 are provided on the both sides of the support portion 43 in the longitudinal direction of the base portion 42. Each light source fixing portion 44 is shaped like a letter C in a dimension corresponding to the major diameter of the light sources 6 of a circular cylindrical shape. Little protrusions are provided at three points on the inner side of the C-shaped portion of the light source fixing portion 44. The two pin portions 45 are provided to stand upright in a direction opposite to the support portion 43 from the other surface of the base portion 42. The two pin portions 45 are provided in a state where each protrudes from the center of the corresponding lid portion 42a. The two expansion and contraction portions 46 are provided to the tip end portions of the corresponding pin portions 45. The expansion and contraction portions 46 are designed to undergo elastic (flexural) deformation in a direction in which the major diameter expands and contracts. The major diameter of the expansion and contraction portions 46 is set to be larger than the major diameter of the pin portions 45.

The housing 41 is provided to enclose the reflection member 4, the light control member 5, and the light sources 6. The housing 41 is of a wing-like shape when viewed from the side surface and the reflection member 4 is formed to conform to this wing-like shape. Accordingly, the inner surface of the housing 41 is covered with the reflection member 4. Because the housing 41 serves as a member to maintain the strength of the surface light source device 3, it is obtained, for example, by pressing a thin metal plate with the purpose of achieving high strength and releasing heat generated by the light sources 6 efficiently to the outside. It should be appreciated, however, that the housing 41 is not limited to this example and the housing 41 may be made of resin.

The housing 41, the sheet-like reflection member 4 layered on the housing 41, and the sheet-like light control member 5 layered on the reflection member 4 are provided with pairs of through-holes 51, 52, and 53, respectively, at a plurality of points (herein, only two points for ease of description) in the mutually corresponding portions. Herein, the term, "mutually corresponding portions", means portions in which the through-holes are disposed one on another concentrically when the housing 41, the reflection member 4, and the light control member 5 are layered. The through-holes 51 in the housing 41 are set to have a smaller hole diameter than the through-holes 52 in the reflection member 4. The through-holes 53 in the light control member 5 are set to have the same hole diameter as the through-hole 52 in the reflection member 4. Also, the hole diameter of the through-holes 51 in the housing 41 is set to be larger than the major diameter of the pin portions 45 of the fixing members 40 and smaller than the major diameter of the expansion and contraction portions 46.

In the first embodiment, the two fixing members 40 are disposed at the opposing corners of the image display device 1 by way of example. In this case, when the screen of the display panel 2 is provided to stand vertically or face down, the light control member 5 may possibly separate from the reflection member 4 in a diagonal direction in which the fixing members 40 are absent.

Figure 3:
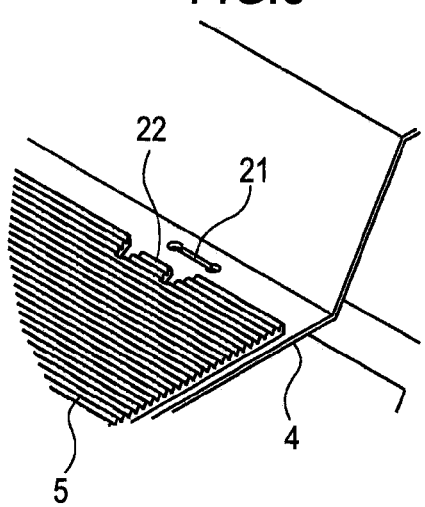
FIG. 3 is a perspective view showing the configuration of a stopper portion.

In order to avoid such an inconvenience, the first embodiment adopts a configuration in which stopper portions 20 used to stop the reflection member 4 and the light control member 5 by each other are provided in the vicinity of the four corner portions including the opposing corners at which the fixing members 40 are absent. As is shown in FIG. 3, each stopper portion 20 includes a hole portion 21 provided in the reflection member 4 and a tongue piece portion 22 provided to the light control member 5 corresponding to the hole portion 21. The stopper potion 20 is provided to the outside of the effective screen region of the display panel 2. The term, "effective screen region", referred to herein means a region in which an image is actually displayed for the user. For example, in the case of a structure in which the outer peripheral portion of the display panel 2 is surrounded by an unillustrated frame member, the effective screen region is the screen region surrounded by the frame member.

The hole portion 21 is formed in the shape of a narrow slit so as to penetrate through the reflection member 4. The hole portion 21 is provided at the corner portion of the reflection surface 4a of the reflection member 4. The slit width of the hole portion 21 is set correspondingly to the thickness of the tongue piece portion 22 so that the tongue piece portion 22 can be inserted into and pulled out from the hole portion 21. The both end portions of the hole portion 21 in the longitudinal direction are formed in a round shape by swelling considerably in comparison with the slit width of the hole portion 21. The tongue piece portion 22 is formed integrally with the light control member 5. The tongue piece portion 22 is formed in a trapezoidal shape with the edge portion on the longer side of the light control member 5 being notched partially. Each tongue piece portion 22 is formed at the edge portion of the longer side of the light control member 5 so as to protrude outward.

The tongue piece portion 22 is formed at the edge portion of the longer side of the light control member 5 by way of example. It should be appreciated, however, that the configuration is not limited to this example and the tongue piece portion 22 may be formed at the edge portion of the shorter side of the light control member 5 or the tongue piece portion 22 may be formed at the edge portions of all the four sides of the light control member 5. In any case, the hole portion 21 corresponding to each tongue piece portion 22 is provided in the reflection member 4.

With the image display device 1 configured as above, in a case where the surface light source device 3 is assembled, the reflection member 4 and the light control member 5 are attached to the housing 41 with the fixing members 40. Herein, the reflection member 4 and the light control member 5 layered one on the other are disposed on the top face of the housing 41 first. In this instance, the respective members are positioned so that the through-holes 51, 52, and 53 are disposed concentrically. Also, the respective tongue piece portions 22 provided to the light control member 5 are inserted into the hole portions 21 in the reflection member 4 corresponding to the respective tongue piece portions 22. Consequently, the reflection member 4 and the light control member 5 are in a state where the both members are stopped at portions (the stopper portions 20) in which the tongue piece portions 22 are inserted into the hole portions 21.

Subsequently, the pin portions 45 provided to the fixing portions 40 and the expansion and contraction portions 46 at the tip ends of the pin portions 45 are inserted (press-fit) into the through-holes 51, 52, and 53 from the side of the light control member 5. Accordingly, the major diameter of the expansion and contraction portions 46 is decreased by elastic deformation and the expansion and contraction portions 46 in this state protrude to the outer surface side of the housing 41 by passing through the through-holes 51, 52, and 53. When the base portions 42 of the fixing members 40 are pushed hard into the light control member 5, the expansion and contraction portions 46 pass through the through-holes 51, 52, and 53 thoroughly, upon which the major diameter of the expansion and contraction portions 46 restores to the original dimension in association with the opening by elastic deformation. The expansion and contraction portions 46 of the fixing members 40 are thus in a state where they are stopped at the outer surface of the housing 41. In short, the expansion and contraction portions 46 serve as folded portions and are hooked onto the outer surface of the housing 41. It thus becomes possible to prevent a fall-off of the pin portions 45 of the fixing members 40 in a reliable manner. A work to insert the tongue piece portions 22 into the hole portions 21 may be performed either before or after the attachment of the fixing members 40.

Figure 4:
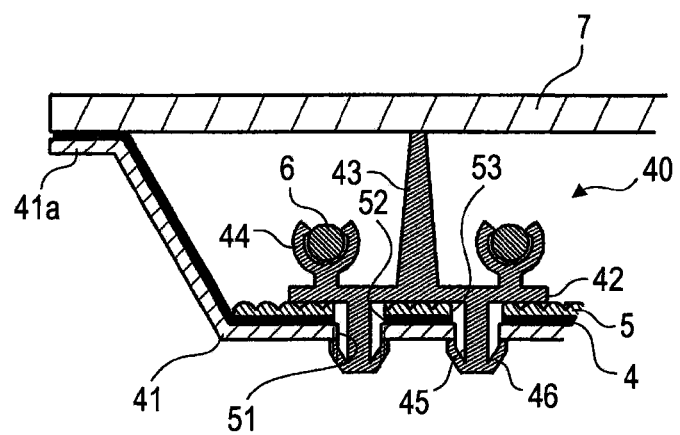
FIG. 4 is a cross section showing an attachment state of the fixing member.

After the fixing members 40 are attached as described above, the light sources 6 are attached to the light source fixing portion 44. The light sources 6 may be attached before the attachment of the fixing members 40. Subsequently, the diffusion member 7 is attached in such a manner so as to shield a space above the light sources 6. In this instance, as is shown in FIG. 4, the tip end portion of the support portion 43 abuts on the bottom face of the diffusion member 7. Hence, not only is the diffusion member 7 supported but also the positional relation among the respective members (4, 5, 41, and 7) is defined in the thickness direction of the surface light source device 3. Also, the diffusion member 7 is attached in such a manner that the longer side portions thereof are placed on reception portions 41a of the housing 41. Also, the diffusion member 7 is placed on the reception portions 41a of the housing 41 via the reflection member 4.

Figure 5:
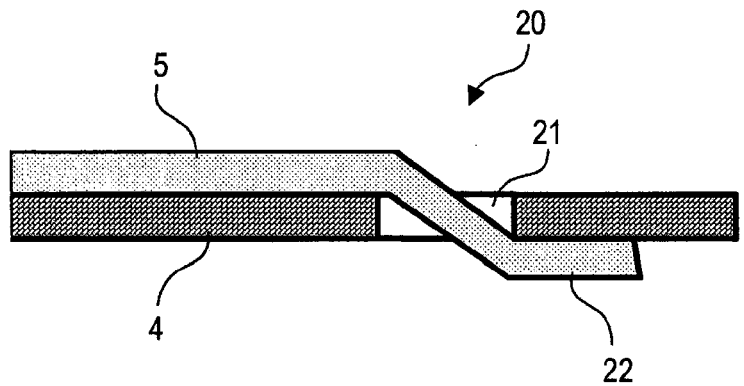
FIG. 5 is a cross section showing optical components in a state stopped by the stopper portion.

Herein, as is shown in FIG. 5, the positional relation of the reflection member 4 and the light control member 5 in the layered direction is inverted between the portions (stopper portions) in which the tongue piece portions 22 are inserted into the hole portions 21 and the other portions. More specifically, in the portions where the tongue piece portions 22 are inserted into the hole portions 21, the positional relation is that the light control member 5 is the bottom layer and the reflection member 4 is the top layer. By contrast, in the other portions, the positional relation is that the light control member 5 is the top layer and the reflection member 4 is the bottom layer. As is shown in FIG. 5, this stopped state is obtained by allowing a part (the hole portions 21) of the reflection member 4 and a part (the tongue piece portions 22) of the light control member 5 to intersect with each other. Accordingly, in a state where the tongue piece portions 22 are inserted into the hole portions 21, displacement (separation) of the light control member 5 in the layered direction (thickness direction) is prevented by the reflection member 4. Hence, for example, in a case where the image display device 1 is used with the screen of the display panel 2 standing vertically, it becomes possible to prevent separation of the light control member 5. In addition, deterioration of the display quality resulting from separation of the light control member 5 can be prevented. Further, because the hole portions 21 are provided integrally with the reflection member 4 while the tongue piece portions 22 are provided integrally with the light control member 5, it becomes possible to prevent separation of the light control member 5 without increasing the number of components, such as the fixing members 40.

As has been described, displacement of the light control member 5 is regulated in the layered direction. However, there is a degree of freedom, for example, of several hundreds μm or more because of dimensional tolerances of the tongue piece portions 22 and the hole portions 21 in a direction (the plane direction of the reflection member 4) parallel to the screen of the display panel 2. Hence, even when the linear expansion coefficients of the respective materials forming the reflection member 4 and the light control member 5 are different, there is no risk that the light control member 5 undergoes deformation because of the influences of thermal expansion and thermal contraction. Consequently, for example, even when the light control member 5 expands or contracts because of the influences of heat from the light sources 6, deflection will not occur in the light control member 5.

Also, because it is configured in such a manner that the tongue piece portions 22 can be inserted into and pulled out from the hole portions 21, it is possible to re-attach the light control member 5 to another unillustrated reflection member or to re-attach another unillustrated light control member to the reflection member 4. This configuration therefore facilitates replacement of components.

In addition, because the stopper portions 20 are provided to the outside of the effective screen region of the display panel 2, the presence of the stopper portions 20 does not have adverse influences to the quality of an image visually confirmed by the user.

In a case where the rigidity of the reflection member 4 is sufficiently high, it is possible to suppress separation of the light control member 5 without any problem. However, in a case where the rigidity of the reflection member 4 is low, there is a possibility that the light control member 5 separates from the housing 41 together with the reflection member 4. In such a case, it is preferable to fix the back surface of the reflection member 4 to the housing 41 using a bonding member, such as a double-sided adhesive tape.

2. Second Embodiment

Figure 6:
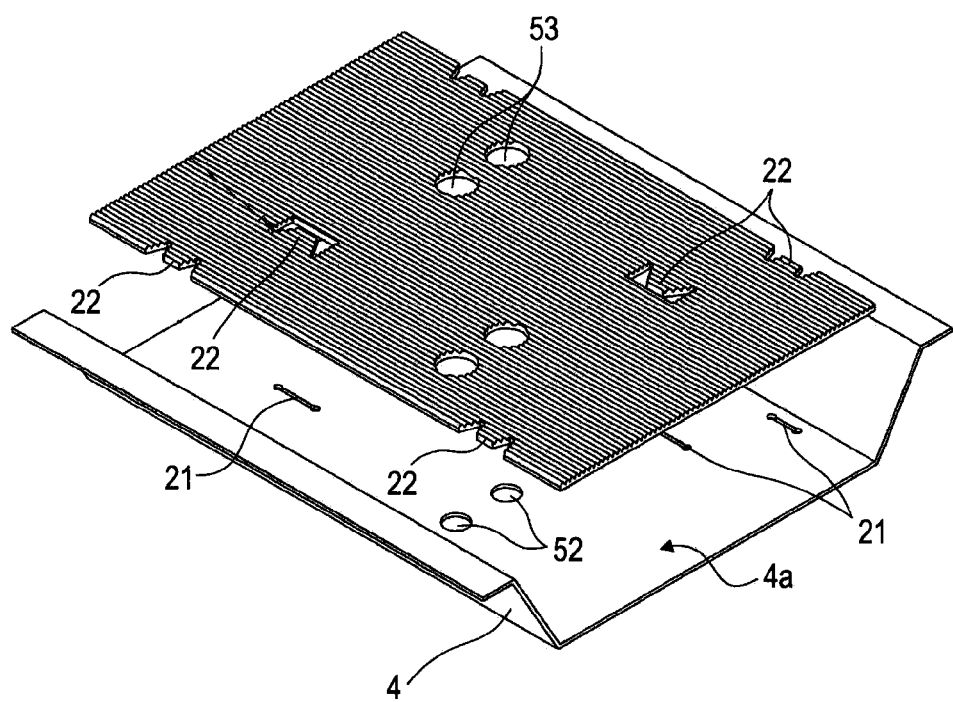
FIG. 6 is an exploded perspective view showing the configuration of a major portion of an image display device according to an embodiment of the present invention.

FIG. 6 is an exploded perspective view showing the configuration of a major portion of an image display device according to a second embodiment of the present invention. Referring to FIG. 6, the tongue piece portions 22 are provided to the inside of the effective screen region of the display panel 2 in addition to the outside of the effective screen region as described above. Within the effective screen region, two tongue piece portions 22 are provided to other diagonal positions with respect to the two fixing members 40 provided at the diagonal positions as described above and the hole portions 21 corresponding to these tongue piece portions 22 are provided in the reflection member 4.

By providing the stopper portions 20 formed of the hole portions 21 and the tongue piece portions 22 also to the inside of the effective screen region of the display panel 2 in this manner, the reflection member 4 and the light control member 5 are formed integrally. Accordingly, it becomes possible to handle the reflection member 4 and the light control member 5 as one unit.

In a case where the surface light source device 3 configured as above is manufactured, by making the reflection member 4 and the light control member 5 forming the reflection portion together into one piece with the stopper portions 20 in a state where they are layered one on the other and then attaching the reflection portion to the housing 41, there can be obtained the following advantage. That is, the reflection member 4 and the light control member 5 are allowed to move freely until these optical components are fixed with the fixing members 40 by merely placing the reflection member 4 and the light control member 5 in a layered state on the housing 41. It is therefore necessary to position the reflection member 4 and the light control member 5 before the fixing members 40 are attached. On the contrary, in a case where the reflection member 4 and the light control member 5 are made into one piece with the stopper portions 20, the positional relation of these two optical components is defined in this state, which makes it unnecessary to position these optical components. In addition, in a case where the fabrication step of making the reflection member 4 and the light control member 5 into one piece is provided independently as one step in the fabrication sequence of the surface light source device 3, the through-holes 52 and 53 provided to the respective members can be used as the positioning guides in the fabrication step.

Figure 7A:
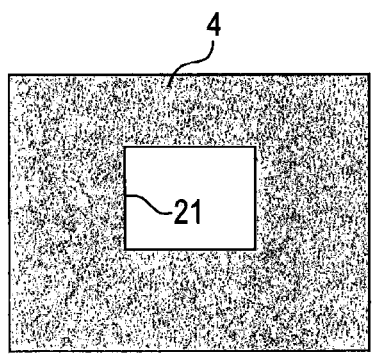
FIGS. 7A and 7B are views used to describe another example of the configuration of the stopper portion.
Figure 7B:
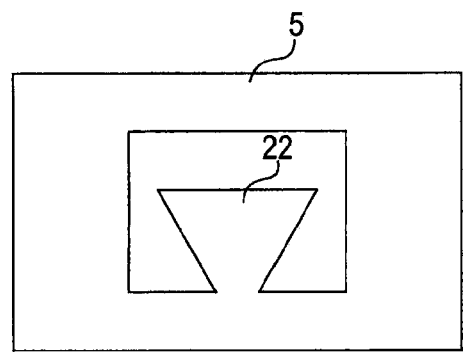

Regarding the shapes of the hole portions 21 and the tongue piece portions 22 forming the stopper portions 20, for example, as is shown in FIGS. 7A and 7B, the hole potions 21 may be of a rectangular shape when viewed in a plane and the tongue piece portions 22 may be of a trapezoidal shape when viewed in a plane.

Although it is not shown in the drawing, it may be configured in such a manner that the tongue piece portions are provided to the reflection member 4 and the hole portions corresponding to the tongue piece portions are provided in the light control member 5. Further, it maybe configured in such a manner that a functional portion forming the stopper portions may be provided as a separate member to at least one of the reflection member 4 and the light control member 5.

3. Third Embodiment

A third embodiment of the present invention will be described by labeling like reference numerals to like components with respect to the first embodiment above.

Figure 8:
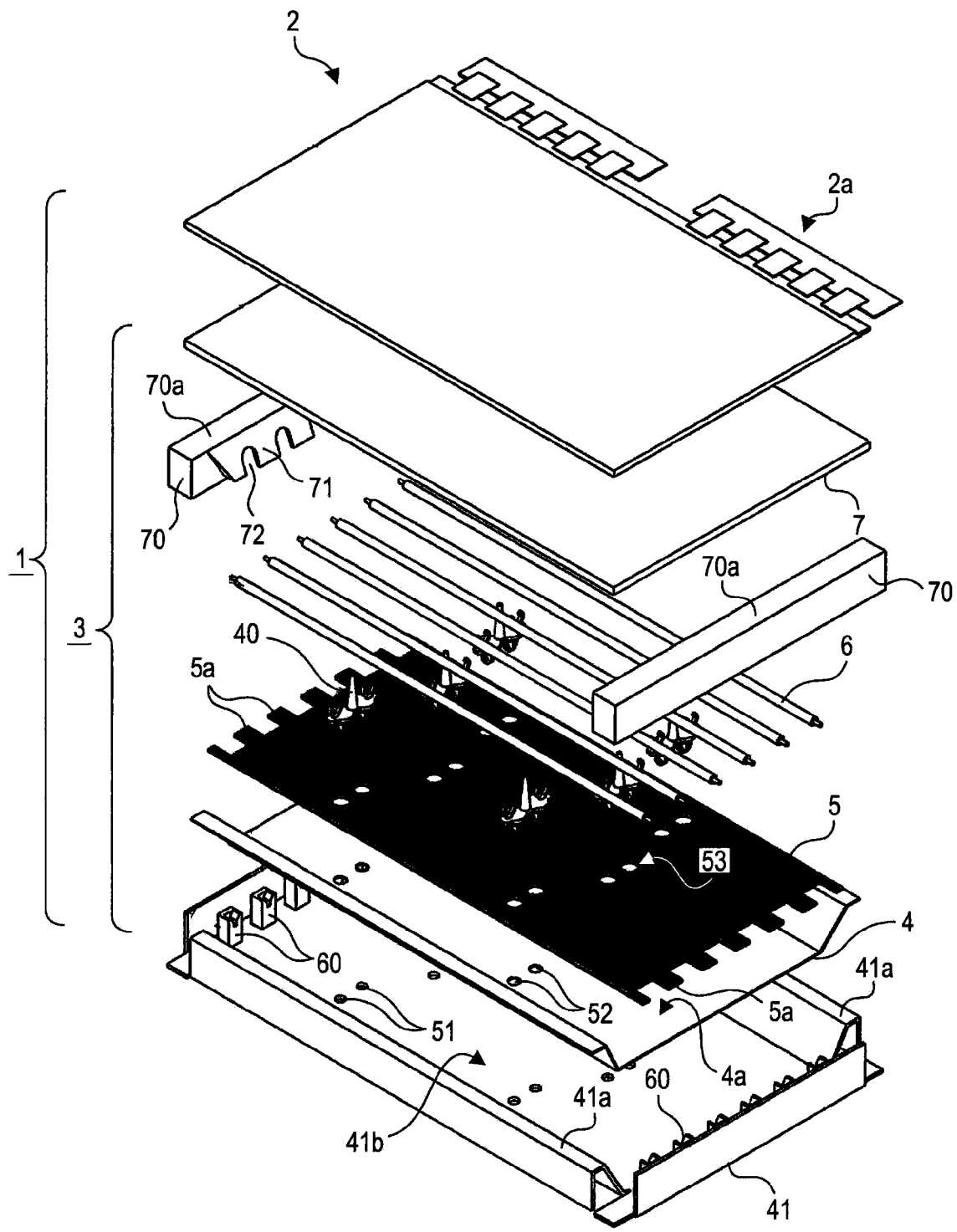
FIG. 8 is an exploded perspective view showing the configuration of an image display device according to an embodiment of the present invention.

FIG. 8 is an exploded perspective view showing the configuration of an image display device according to the third embodiment. Largely speaking, an image display device 1 includes a display panel 2 on which an image is displayed and a surface light source device 3 that irradiates light to the display panel 2. In a case where the image display device 1 is a liquid crystal display, the display panel 2 is a liquid crystal panel and the surface light source device 3 is a backlight.

The image display device 1 is formed of necessary components disposed at the corresponding positions within an unillustrated outer housing. In this case, the outer housing is formed in a box shape that is flat from front to rear and opens toward the front. The display panel 2 is disposed at a position to close the opening from inside. The display panel 2 is of a configuration in which, for example, a transmissive color liquid crystal panel is sandwiched by two polarization plates from the front and rear (the light incident side and the light exiting side). In this case, the display panel 2 displays a full-color video when driven by an active matrix method.

The display panel 2 displays an image thereon by selectively transmitting light irradiated from the surface light source device 3 pixel by pixel that are arrayed in a matrix fashion. A drive circuit portion 2a is connected to the end portion of the display panel 2. The drive circuit portion 2a is a circuit portion that controls driving of the display panel 2.

The surface light source device 3 is disposed inside the outer housing. The surface light source device 3 includes a reflection member 4, a light control member 5, a plurality of light sources 6, a diffusion member 7, a housing 41, sockets 60, and power feeding cover members 70. When the surface light source device 3 is viewed from the side of the display panel 2, the reflection member 4, the light control member 5, the light sources 6, and the diffusion member 7 are disposed sequentially from back to front. The surface light source device 3 is disposed in a state where the diffusion member 7 opposes the display panel 2. Each of the reflection member 4, the light control member 5, and the diffusion member 7 is formed in a sheet-like shape. The term, "sheet-like shape", referred to herein includes a plate-like shape and a film-like shape independently of the rigidity of members.

The reflection member 4 uses the surface opposing the light sources 6 and the diffusion member 7 as a reflection surface 4a and is formed in the shape of a wing when viewed from the side surface. The reflection member 4 has rigidity high enough to maintain the wing-like shape when viewed from the side surface. The reflection surface 4a of the reflection member 4 is disposed to be parallel to the diffusion member 7. The reflection member 4 is classified into a type chiefly using mirror refection and a type chiefly using diffuse reflection. Herein, it is preferable to use the type chiefly using diffuse reflection for the following reason. That is, in the case of the type chiefly using mirror reflection, directivity of reflection light is so strong that it is acknowledged as irregularities on a display whereas the directivity of reflection light is weak and it is hardly acknowledged as irregularities on a display in the case of the type chiefly using diffuse reflection. The reflection member 4 chiefly using diffuse reflection is obtained, for example, by encapsulating many air bubbles within a PET (polyethylene terephthalate) film. It should be appreciated, however, that the configuration is not limited to this example. In addition, a material forming the reflection member 4 can be either resin or metal.

The light control member 5 is an optical component that forms a reflection portion together with the reflection member 4. The reflection portion is provided on the side opposite to the diffusion member 7 with the light sources 6 interposed therebetween and reflects light emitted from the light sources 6 toward the diffusion member 7. The light control member 5 is formed, for example, in a rectangular shape when viewed in a plane as is shown in the drawing. The light control member 5 is layered on the reflection surface 4a of the reflection member 4. The light control member 5 is formed by layering sheets of a light transmissive material, for example, a transparent material, such as acrylic, polycarbonate, polystyrene, and glass, either solely or in combination.

A plurality of the light sources 6 are aligned in a planar fashion between the diffusion member 7 and the reflection member 4. Each light source 6 is disposed in a state so as to oppose the reflection surface 4a of the reflection member 4 with the light control member 5 interposed therebetween. As the light sources 6, for example, a rod-shaped cold cathode fluorescent lamp (CCFL) is used. It should be appreciated, however, that the light sources 6 are not limited to the cold cathode fluorescent lamps and other light sources, such as a hot cathode fluorescent lamp, a xenon lamp, and a light emitting diode (LED), can be used as well.

Each light source 6 is formed in an elongate circular cylindrical shape. The light sources 6 are disposed in such a manner that the longitudinal direction (extending direction) of the light sources 6 is along the right-left direction of the screen of the display panel 2. The light sources 6 are supported on fixing members 40 at somewhere in the middle in the longitudinal direction. The configuration of the fixing members 40 will be described below. The light sources 6 are disposed at substantially regular intervals in the top-bottom direction of the screen of the display panel 2. The both end portions of each light source 6 in the longitudinal direction are held in the sockets 60 serving as power feeding portions. It is therefore configured in such a manner that the light sources 6 emit light when power is fed from the sockets 60. For a compact surface light source device, a lamp bent in the shape of a letter U is used as the light source in some cases. However, the present invention is applicable independently of the shape of the light source.

The diffusion member 7 diffuses light incident on the diffusion member 7 in order to make light that goes incident on the display panel 2 homogeneous. Also, the diffusion member 7 is disposed between the light sources 6 and the display panel 2 in a state where it opposes the reflection surface 4a of the reflection member 4. The diffusion member 7 is furnished with a capability of supplying homogeneous light toward the display panel 2 by diffusing light incident on the diffusion member 7. As the diffusion member 7, for example, a mixture with a directionless light scattering substance can be used.

The light control member 5 will now be described more in detail. The light control member 5 is furnished with a light guiding capability of guiding light incident on the light control member 5 among rays of light emitted from the respective light sources 6 in a predetermined direction. The term, "a predetermined direction", referred to herein means a direction in which a plurality of the light sources 6 are aligned side by side in a planar fashion as described above. The light guiding capability of the light control member 5 is exerted by a prism function of a concavo-convex structure portion (not shown) formed on either one surface or the both surfaces of the light control member 5. In the concavo-convex structure portion of the light control member 5, the cross section when viewed in a direction orthogonal to the alignment direction of the light source 6 is formed in a geometric configuration. As an example of the sectional geometric configuration, the concavo-convex structure portion is formed in a continuous concavo-convex shape having a triangular cross section. Each convex portion in the concavo-convex structure portion having a triangular cross section substantially functions as a prism and the light guiding capability of the light control member 5 is achieved by this prism function. By guiding part of light irradiated from the light sources 6 to the light control member 5 in the alignment direction of the light sources 6 using the light guiding capability, the light control member 5 forces incident light from the light sources 6 to head toward the diffusion member 7 at a position shifted from the light incident position in the alignment direction of the light source 6. Consequently, light reflected on the reflection portion (members 4 and 5) and headed toward the diffusion member 7 is made homogeneous by the light guiding capability of the light control member 5. It thus becomes possible to obtain a reduction effect on the lamp image. The configuration and the function of the light control member 5 are described in commonly owned earlier Japanese Patent Application JP 2008-190601.

By forming the light control member 5 using, for example, a material absorbing UV rays, an UV resistance capability is furnished to the light control member 5. Components of light emitted from the light sources 6 contain UV rays. Accordingly, by furnishing the UV resistance capability to the light control member 5, it becomes possible to prevent deterioration of the light control member 5.

The diffusion member 7 has to have sufficient diffusivity in order to eliminate the directivity of light coming from the light control member 5 and also to let the lamp image vanish. In addition, in order to enhance the use efficiency of light emitted from each light source 6, it is necessary for the diffusion member 7 to have low light absorptance. In order to ensure the characteristics as above, the diffusion member 7 is formed by mixing a material used as the base material with transparent fine particles having a different refractive index. As the base material, for example, polystyrene is used. As the transparent fine particles, for example, silicon or acrylic is used.

It is also possible to obtain a desired optical characteristic by providing an arbitrary optical component on the light-exiting surface of the diffusion member 7 so as to achieve the desired optical characteristic. For example, it is possible to use an optical component formed by scattering and fixedly attaching beads onto a base material, such as transparent PET, with an expectation to achieve the lens effect from the curved surfaces of the beads, a sheet on which fine prisms are arrayed in order to enhance the luminance in the front direction, or a polarization reflection sheet.

There is a case where a desired display quality is not obtained by merely disposing the light control member 5 between the light sources 6 and the reflection member 4 and a portion on the light sources 6 looks brighter than the other portions. In such a case, it may be configured in such a manner that the prism function portion same as that in the light control member 5 is provided to the surface of the diffusion member 7, a prism sheet is inserted between the light sources 6 and the diffusion member 7, or a prism sheet is inserted between the diffusion member 7 and the display panel 2.

The fixing members 40 are provided to fix the reflection member 4 and the light control member 5 to a housing 41. The fixing members 40 are obtained, for example, by molding a white resin material. A material obtained, for example, by mixing polycarbonate with a white pigment can be used. It should be appreciated, however, that a resin material other than this example can be used as well. For example, as is shown in FIG. 2, each fixing member 40 has a structure in which a base portion 42, a support portion 43, two light source fixing portions 44, two pin portions 45, and two expansion and contraction portions 46 are formed integrally. The base portion 42 is formed in the shape of a flat plate that looks like glasses having two lid portions 42a each swelling substantially in a circular shape when viewed in a plane. The support portion 43 is provided to the base portion 42 at the center in the longitudinal direction in an upright standing state from one surface of the base portion 42. The major diameter of the support portion 43 becomes smaller gradually toward the tip end.

The two light source fixing portions 44 are provided on the both sides of the support portion 43 in the longitudinal direction of the base portion 42. Each light source fixing portion 44 is shaped like a letter C in a dimension corresponding to the major diameter of the light sources 6 of a circular cylindrical shape. Little protrusions are provided at three points on the inner side of the C-shaped portion of the light source fixing portion 44. The two pin portions 45 are provided to stand upright in a direction opposite to the support portion 43 from the other surface of the base portion 42. The two pin portions 45 are provided in a state where each protrudes from the center of the corresponding lid portion 42a. The two expansion and contraction portions 46 are provided to the tip end portions of the corresponding pin portions 45. The expansion and contraction portions 46 are designed to undergo elastic (flexural) deformation in a direction in which the major diameter expands and contracts. The major diameter of the expansion and contraction portions 46 is set to be larger than the major diameter of the pin portions 45.

The housing 41 is provided to enclose the reflection member 4, the light control member 5, and the light sources 6. The housing 41 has a portion formed in a wing-like shape when viewed from the side surface and the reflection member 4 is formed to conform to this wing-like shape. Accordingly, the inner surface of the housing 41 is covered with the reflection member 4. Because the housing 41 serves as a member to maintain the strength of the surface light source device 3, it is obtained, for example, by pressing a thin metal plate with the purpose of achieving high strength and releasing heat generated by the light sources 6 efficiently to the outside. It should be appreciated, however, that the housing 41 is not limited to this example and the housing 41 may be made of resin.

The housing 41, the sheet-like reflection member 4 layered on the housing 41, and the sheet-like light control member 5 layered on the reflection member 4 are provided with pairs of through-holes 51, 52, and 53, respectively, at a plurality of points (herein, only six points for ease of description) in the mutually corresponding portions. Herein, the term, "mutually corresponding portions", means portions in which the through-holes are disposed one on another concentrically when the housing 41, the reflection member 4, and the light control member 5 are layered. The through-holes 51 in the housing 41 are set to have a smaller hole diameter than the through-holes 52 in the reflection member 4. The through-holes 53 in the light control member 5 are set to have the same hole diameter as the through-hole 52 in the reflection member 4. Also, the hole diameter of the through-holes 51 in the housing 41 is set to be larger than the major diameter of the pin portions 45 of the fixing members 40 and smaller than the major diameter of the expansion and contraction portions 46.

The sockets 60 are power feeding portions that feed power to the light sources 6. Two sockets 60 are provided for one light source 6. Accordingly, as is shown in the drawing, in a case where six light sources 6 are incorporated, six on one side of the light sources 6 in the longitudinal direction and six on the other side, that is, a total of 12 sockets 60 are provided. The sockets 60 are fixed to the bottom plate 41b of the housing 41 in sets of two. The respective sets of the sockets 60 are provided at predetermined intervals in the alignment direction of the light sources 6. The both ends of each light source 6 in the longitudinal direction form electrode portions and a guiding groove having a Y-shaped cross section is formed in each socket 60 so as fit the electrode portion. An electrical connection state between the light sources 6 and the sockets 60 is obtained by fitting electrode portions at the both ends of the light sources 6 into the guiding grooves of the sockets 60 in pairs (in the same sets).

In a state where the electrode portions at the both ends of each light source 6 are fit in the guiding grooves of the corresponding sockets 60, the both ends of the light source 6 in the longitudinal direction are fixed by a pair of the sockets 60. Accordingly, as is shown in the drawing, in a case where two points of the light source 6 in the longitudinal direction are fixed using the two fixing portions 40, one light source 6 is fixed at a total of four points including the points fixed by the sockets 60. In such a case, in order to support the elongate light source 6 in a balanced manner, the two fixing members 40 supporting one light source 6 are attached at positions remote from the both ends (sockets 60) of each light source 6.

Incidentally, it is preferable that the fixing members 40 are provided to fewer points in order to avoid an increase of the number of components. Also, in a case where the light source 6 is supported using the fixing members 40, heat of the light source 6 is absorbed at portions in contact with the fixing members 40. Accordingly, the light emission efficiency of the light source 6 varies at the portions in contact with the fixing members 40, which may possibly result in an inconvenience on a display. In this regard, too, it is preferable to reduce the number of points at which the fixing members 40 are provided.

The power feeding cover members 70 are attached to the housing 41 in a state so as to cover the sockets 60. The power feeding cover members 70 are disposed one on one end and one on the other end of the light source 6 in the longitudinal direction. Each power feeding cover member 70 is a hollow member in a length corresponding to the shorter dimension of the diffusion member 7 and has an internal space large enough to accommodate six sockets 60 provided on one side collectively. Because the power feeding cover members 70 are disposed in close proximity to the power feeding portions (sockets 60) to which a high voltage is supplied, they are made of an insulating material, such as resin. In addition, because the power feeding cover members 70 reflect light from the light source 6 to return the light towards the diffusion member 7, it is formed of a white resin material.

The power feeding members 70 support the diffusion member 7 together with the housing 41. The power feeding cover members 70 support the two shorter side portions of the diffusion member 7 at reception portions 70a from beneath. The housing 41 supports the two longer side portions of the diffusion member 7 at the reception portions 41a from beneath. Each power feeding cover member 70 has an inclined portion 71 extending diagonally below from the reception portion 70a. The inclined portion 71 is formed to ensure the accommodation space for the sockets 60 and to reflect light from the light sources 6 efficiently toward the diffusion member 7. U-shaped notches 72 are made in each inclined portion 71 in order to avoid positional interference (contact) with the light sources 6. The notches 72 are made in a one-to-one correspondence with the sockets 60. Accordingly, six notches 72 are made in one power feeding cover member 70 correspondingly to the six light sources 6. The respective notches 72 are made in the inclined portions 71 of the power feeding cover members 70 to be positioned on virtual lines connecting pairs of mutually opposing sockets 60.

The two (a pair of) power feeding cover members 70 are attached to the housing 41 with the respective inclined portions 71 faced inside. Accordingly, the two power feeding cover members 70 are disposed inside the housing 41 while the inclined portions 71 oppose each other. Also, in a state where the power feeding cover members 70 are attached to the housing 41, clearings corresponding to the thickness dimension of the reflection member 4 and the light control member 5 are defined between the lower ends of the inclined portions 71 of the power feeding cover members 70 and the bottom plate 41b of the housing 41.

Meanwhile, a plurality of comb-shaped protrusion portions 5a are provided to two shorter side portions of the light control member 5. The respective protrusion portions 5a are formed integrally with the light control member 5 so as to extend in the longitudinal direction of the light control member 5 from the shorter side portions of the light control member 5. A concave portion is formed between every two protrusion portions 5a formed adjacently in the transverse direction of the light control member 5. A total of six concave portions are formed to each of the two shorter side portions of the light control member 5. In a state where the reflection member 4 and the light control member 5 are attached inside the housing 41 using the fixing members 40, one socket 60 is disposed in each concave portion.

With the image display device 1 configured as above, when the surface light source 3 is assembled, the reflection member 4 and the light control member 5 layered one on the other are disposed on the top face (on the bottom plate 41b) of the housing 41. In this instance, the respective members are positioned so that the through-holes 51, 52, and 53 are disposed concentrically.

Subsequently, the fixing members 40 are attached to the housing 41 by inserting the pin portions 45 into the through-holes 51, 52, and 53. When the fixing members 40 are attached, the pin portions 45 of the fixing members 40 and the expansion and contraction portions 46 at the tip ends of the pin portions 45 are inserted (press-fit) into the through-holes 51, 52, and 53 from the side of the light control member 5. Accordingly, the major diameter of the expansion and contraction portion 46 is decreased by elastic deformation and the expansion and contraction portions 46 in this state protrude to the outer surface side of the housing 41 by passing through the through-holes 51, 52, and 53. When the base portions 42 of the fixing members 40 are pushed hard into the light control member 5, the expansion and contraction portions 46 pass through the through-holes 51, 52, and 53 thoroughly, upon which the major diameter of the expansion and contraction portions 46 restores to the original dimension in association with the opening by elastic deformation. The expansion and contraction portions 46 of the fixing members 40 are thus in a state where they are stopped at the outer surface of the housing 41. In short, the expansion and contraction portions 46 serve as folded portions and are hooked onto the outer surface of the housing 41. It thus becomes possible to prevent a fall-off of the pin portions 45 of the fixing members 40 in a reliable manner.

Subsequently, the light sources 6 are attached to the respective fixing members 40 and the both ends of the light sources 6 are attached to the sockets 60. The light sources 6 are attached to the fixing members 40 by fitting the light sources 6 into the light source fixing portions 44 of the fixing members 40. It should be appreciated that the light sources 6 may be attached to the fixing members 40 before the fixing members 40 are attached to the housing 41.

Figure 9:
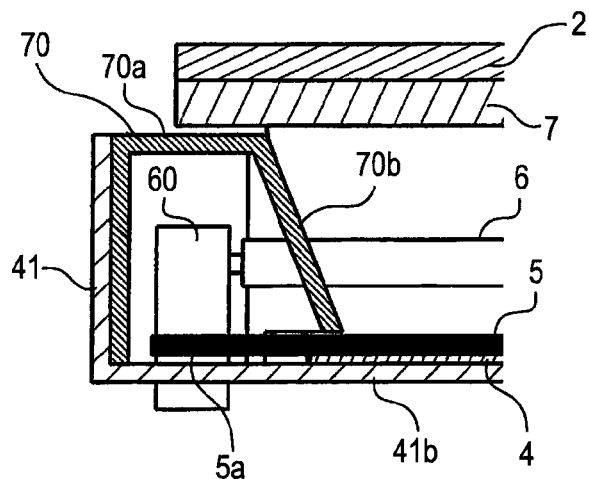
FIG. 9 is a cross section showing the configuration of a major portion of the image display device according to an embodiment of the present invention.

Subsequently, the two power feeding cover members 70 are attached to the housing 41. In this instance, as is shown in FIG. 9, the protrusion portions 5a provided to the shorter side portions of the light control member 5 are in a state where they are inserted into spaces between the power feeding cover members 70 and the housing 41. More specifically, clearings corresponding to the thickness dimension of the reflection member 4 and the light control member 5 are defined between the lower ends of the inclined portions 71 of the power feeding cover members 70 and the bottom plate 41b of the housing 41 as has been described. On the contrary, the protrusion portions 5a of the light control member 5 are disposed in a state where they extend to the side of the sockets 60 from the clearings defined between the lower ends of the inclined portions 71 of the power feeding cover members 70 and the bottom plate 41b of the housing 41 (in a state where the protrusion portions 5a enter inside the power feeding cover members 70). Also, the protrusion portions 5a of the light control member 5 are disposed on the both sides of the sockets 60 so as to sandwich the sockets 60 in the alignment direction of the light sources 6. Meanwhile, the lower ends of the inclined portions 71 of the power feeding cover members 70 are disposed in a state where they are in close proximity to the top face of the light control member 5 via fine clearings (preferably, clearings of 0.1 to 1 mm) from the light control member 5 (protrusion portions 5a) in the thickness direction of the light control member 5.

Subsequently, the diffusion member 7 is attached so as to shield a space above the light sources 6. In this instance, as is shown in FIG. 4, the tip end portion of the support 43 abuts on the bottom face of the diffusion member 7. Hence, not only is the diffusion member 7 supported but also the positional relation among the respective members (4, 5, 41, and 7) is defined in the thickness direction of the surface light source device 3. Also, the diffusion member 7 is attached in such a manner that the longer side portions are placed on the reception portions 41a of the housing 41 and the shorter side portions are placed on the reception portions 70a of the power feeding cover members 70. In addition, the diffusion member 7 is placed on the reception portions 41a of the housing 41 via the reflection member 4.

In a case where the surface light source device 3 is assembled in the manner as above, a plurality of the protrusion portions 5a provided to the shorter side portions of the light control member 5 are inserted into spaces between the housing 41 and the power feeding cover members 70 at the both ends of the light control member 5 in the longitudinal direction. It thus becomes possible to prevent displacement (separation) of the light control member 5 in the layered direction (thickness direction) by the inclined portions 71 of the power feeding cover members 70. Accordingly, for example, in a case where the image display device 1 is used with the screen of the display panel 2 standing vertically, it becomes possible to prevent separation of the light control member 5 by the power feeding cover members 70. In addition, regardless of whether the light control member 5 is layered on the reflection member 4, the power feeding cover members 70 are members necessary from the start to cover the sockets 60 and support the diffusion member 7. Hence, in a case where separation of the light control member 5 is prevented using the power feeding cover members 70, there is no increase of the number of components. Consequently, in the third embodiment, too, it becomes possible to prevent separation of the light control member 5 without increasing the number of components, such as the fixing members 40.

Also, in order to prevent separation of the light control member 5 using the power feeding cover members 70, there is substantially no problem by allowing the lower ends of the inclined portions 71 of the power feeding cover members 70 to come into contact with the surface (top face) of the light control member 5. It should be noted, however, that when such a contact is allowed, there may be a case where deflection (crimping) occurs in the light control member 5 because of thermal deformation of the power feeding cover members 70 and a difference of thermal expansion coefficients between the light control member 5 and the power feeding cover members 70. In order to prevent the deflection of the light control member 5, it is preferable to ensure fine clearings between the lower ends of the inclined portions 71 of the power feeding cover members 70 and the surface of the light control member 5 (protrusion portions 5a). Also, it is preferable to set these clearings by taking the rigidity of the light control member 5 and the power feeding cover members 70 into account.

4. Fourth Embodiment

Figure 10:
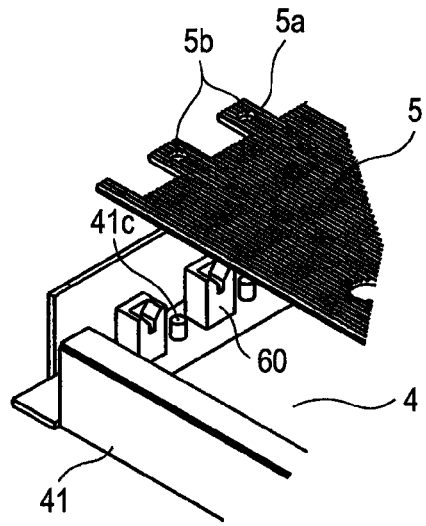
FIG. 10 is an exploded perspective view showing the configuration of a major portion of an image display device according to an embodiment of the present invention.

FIG. 10 is an exploded perspective view showing the configuration of a major portion of an image display device according to a fourth embodiment of the present invention. Referring to FIG. 10, holes 5b are made in the protrusion portions 5a provided to the shorter side portions of the light control member 5. Each hole 5b is made in a circular shape when viewed in a plane so as to penetrate through the corresponding protrusion portion 5a of the light control member 5 in the thickness direction. It should be appreciated, however, that the shape of the holes 5b is not limited to a circular shape and the holes 5b may be of a polygonal shape. Also, for example, assume that the light control member 5 expands and contracts in a particular direction with a temperature change, then it is preferable to form the holes 5b in the shape of a long hole that is long in the expansion and contraction direction of the light control member 5.

Meanwhile, protrusions 41c are provided to the housing 41. The protrusions 41c fit in the holes 5b of the light control member 5. One protrusion 41c is provided between every two sockets 60 provided adjacently in the transverse direction of the diffusion member 7. For example, assume that the housing 41 is formed by processing a thin metal plate, then the protrusions 41c are formed integrally with the housing 41 by means of drawing in the fabrication sequence. It is preferable to form the protrusions 41c integrally with the housing 41 in this manner because there is no increase of the number of components. It should be noted, however, that besides this configuration, for example, in a case where the sockets 60 are fixed to the housing 41 with unillustrated screws, a part of the screws (the heads of the screws) may be allowed to protrude from the bottom plate 41b of the housing 41 and used as the protrusions 41c. Alternatively, protrusions may be provided to the power feeding cover members 70 instead of the housing 41.

Figure 11:
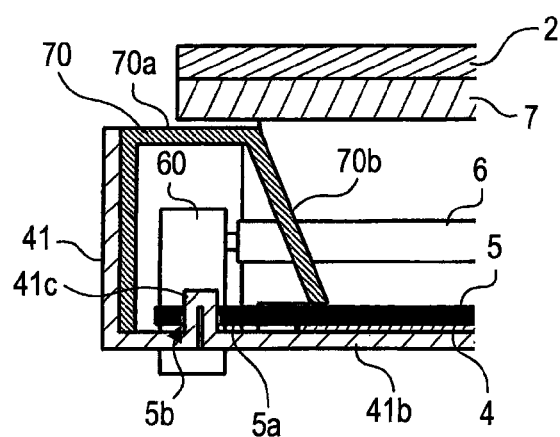
FIG. 11 is a cross section showing the configuration of a major portion of the image display device according to an embodiment of the present invention.

In a case where the surface light source device 3 configured as above is assembled, when the reflection member 4 and the light control member 5 layered one on the other are disposed on the top face (on the bottom plate 41b) of the housing 41, as is shown in FIG. 11, both are fit to each other by fitting the holes 5b made in the protrusion portions 5a of the light control member 5 into the protrusions 41c of the housing 41. Accordingly, it becomes possible to define the position of the light control member 5 in the plane direction before the fixing members 40 are attached to the housing 41. This configuration therefore facilitates the positioning of the housing 41, the reflection member 4, and the light control member 5.

In the respective embodiments described above, two optical components (the reflection member 4 and the light control member 5) are layered to form the reflection portion. It should be appreciated, however, that the configuration is not limited to this example and the reflection portion may be formed by layering three or more optical components. Also, in the third embodiment and the fourth embodiment above, a part (protrusion portions 5a) of one optical component (the light control member 5) is inserted into a space between the housing 41 and the power feeding cover members 70. It should be appreciated, however, that the configuration is not limited to this example and it is also possible to adopt a configuration in which a part of more than one optical component including the light control member 5 is inserted into a space between the housing 41 and the power feeding cover members 70.

Alternatively, it is possible to use a configuration in which both the separation preventing structure for the light control member 5 adopted in the first embodiment and the second embodiment above and the separation preventing structure for the light control member 5 adopted in the third embodiment and the fourth embodiment above are employed at the same time.

The present application contains subject matter related to that disclosed in Japanese Priority Patent Applications JP 2008-275096 and JP 2009-081099 filed in the Japan Patent Office on Oct. 27, 2008 and Mar. 30, 2009, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A surface light source device comprising:
a light source;
a diffusion member that diffuses light; and
reflection means provided on a side opposite to the diffusion member with the light source interposed therebetween for reflecting light emitted from the light source toward the diffusion member,
wherein the reflection means is formed by layering a plurality of optical components and the plurality of optical components are stopped by each other with stopper means.

2. The surface light source device according to claim 1,
wherein the light source is provided in a plural form and aligned in a planar manner; and
the reflection means has a reflection member that uses a surface on a side opposing the diffusion member as a reflection surface and a light control member that is layered on the reflection surface of the reflection member and guides the light emitted from the light sources in an alignment direction of the light sources.

3. The surface light source device according to claim 1,
wherein a positional relation in a layered direction of the plurality of optical components stopped by each other with the stopper means is inverted between a portion stopped with the stopper means and other portions.

4. The surface light source device according to claim 1,
wherein the stopper means includes a tongue piece portion provided to a first optical component among the plurality of optical components and a hole portion provided to a second optical component correspondingly to the tongue piece portion in such a manner that the tongue piece portion is inserted into and pulled out from the hole portion.

5. An image display device comprising:
a surface light source device; and
a display panel that selectively transmits light emitted from the surface light source device,
wherein the surface light source device includes
a light source,
a diffusion member that diffuses light, and
reflection means provided on a side opposite to the diffusion member with the light source interposed therebetween for reflecting light emitted from the light source toward the diffusion member, and
the reflection means is formed by layering a plurality of optical components and the plurality of optical components are stopped by each other with stopper means.

6. The image display device according to claim 5,
wherein the stopper means is provided to an outside of an effective screen region of the display panel.

7. The image display device according to claim 6,
wherein the stopper means is provided to an inside of the effective screen region.

8. A surface light source device comprising:
a light source;
a diffusion member that diffuses light;
reflection means provided on a side opposite to the diffusion member with the light source interposed therebetween for reflecting light emitted from the light source toward the diffusion member;
a housing that encloses the light source and the reflection means; and
a power feeding cover member that is attached to the housing so as to cover a feeding portion from which power is fed to the light source,
wherein the reflection means is formed by layering a plurality of optical components and a part of at least one optical component among the plurality of optical components is inserted into a space between the housing and the power feeding cover member.

9. The surface light source device according to claim 8,
wherein a hole is provided to the part of the optical component inserted into the space between the housing and the power feeding cover member and a protrusion fitting into the hole is provided to one of the housing and the power feeding cover member.

10. An image display device comprising:
a surface light source device; and
a display panel that selectively transmits light emitted from the surface light source device,
wherein the surface light source device includes
a light source,
a diffusion member that diffuses light,
reflection means provided on a side opposite to the diffusion member with the light source interposed therebetween for reflecting light emitted from the light source toward the diffusion member,
a housing that encloses the light source and the reflection means, and
a power feeding cover member that is attached to the housing so as to cover a feeding portion from which power is fed to the light source, and
the reflection means is formed by layering a plurality of optical components and a part of at least one optical component among the plurality of optical components is inserted into a space between the housing and the power feeding cover member.

11. A surface light source device comprising:
a light source;
a diffusion member that diffuses light; and a reflection portion provided on a side opposite to the diffusion member with the light source interposed therebetween and configured to reflect light emitted from the light source toward the diffusion member, wherein the reflection portion is formed by layering a plurality of optical components and the plurality of optical components are stopped by each other with a stopper portion.

12. An image display device comprising:
a surface light source device; and
a display panel that selectively transmits light emitted from the surface light source device,
wherein the surface light source device includes
a light source,
a diffusion member that diffuses light, and
a reflection portion provided on a side opposite to the diffusion member with the light source interposed therebetween and configured to reflect light emitted from the light source toward the diffusion member, and
the reflection portion is formed by layering a plurality of optical components and the plurality of optical components are stopped by each other with a stopper portion.

13. A surface light source device comprising:
a light source;
a diffusion member that diffuses light;
a reflection portion provided on a side opposite to the diffusion member with the light source interposed therebetween and configured to reflect light emitted from the light source toward the diffusion member;
a housing that encloses the light source and the reflection portion; and
a power feeding cover member that is attached to the housing so as to cover a feeding portion from which power is fed to the light source,
wherein the reflection portion is formed by layering a plurality of optical components and a part of at least one optical component among the plurality of optical components is inserted into a space between the housing and the power feeding cover member.

14. An image display device comprising:
a surface light source device; and
a display panel that selectively transmits light emitted from the surface light source device,
wherein the surface light source device includes
a light source,
a diffusion member that diffuses light,
a reflection portion provided on a side opposite to the diffusion member with the light source interposed therebetween and configured to reflect light emitted from the light source toward the diffusion member,
a housing that encloses the light source and the reflection portion, and
a power feeding cover member that is attached to the housing so as to cover a feeding portion from which power is fed to the light source, and
the reflection portion is formed by layering a plurality of optical components and a part of at least one optical component among the plurality of optical components is inserted into a space between the housing and the power feeding cover member.

* * * * *